United States Patent

[11] 3,556,132

[72] Inventors Fay O. Suffron
 Los Angeles;
 Theodore J. Zanias, Anaheim, Calif.
[21] Appl. No. 764,387
[22] Filed Oct. 2, 1968
[45] Patented Jan. 19, 1971
[73] Assignee American Metal Products Corp.
 Los Angeles, Calif.
 a corporation of California

[54] BALL COCK VALVE
 3 Claims, 4 Drawing Figs.
[52] U.S. Cl. .............................................. 137/437,
 137/451
[51] Int. Cl. ........................................... F16k 31/26
[50] Field of Search ................................... 137/410,
 434, 436, 437, 438, 441, 444, 442, 451

[56] References Cited
 UNITED STATES PATENTS
| 1,563,457 | 12/1925 | Van Dyke | 137/441 |
| 1,649,620 | 11/1927 | Siefen | 137/437X |
| 2,142,893 | 1/1939 | Geyer | 137/436 |
| 2,730,122 | 1/1956 | Svirsky | 137/442X |
| 2,869,572 | 1/1959 | Person | 137/437X |
| 2,967,542 | 1/1961 | Einer | 137/437 |

Primary Examiner—William F. O'Dea
Assistant Examiner—David R. Matthews
Attorney—Herzig & Walsh ABSTRACT: The invention is an improved ball cock valve having an antisiphon feature, and improved refill tube feature. The ball cock valve is a float-operated valve, the valve comprising a member with a downwardly extending skirt within which is a sealing disc which closes or seats on the upper end of an inflow pipe. The valve member operates within the upper end of a sleeve or cylindrical member around the inflow pipe. The skirt of the valve member below the seat has a transverse bore and an extending tube which moves vertically with the valve member in an axial slot in the sidewall of the said sleeve, this tube being connected to a tube which is the refill tube that leads to the overflow pipe in the flush tank in which the ball cock valve is used. The area or space around the valve member in the upper end of the sleeve or cylinder is open to atmosphere and provides an air gap preventing siphoning or backflow, that is, it provides an antisiphoning feature. The pressure of water flowing in through the inflow pipe and impinging against the valve seat and reversing in direction inside the skirt of the valve member produces a pressure which assures a flow of water into the refill tube for refilling the toilet bowl after flushing.

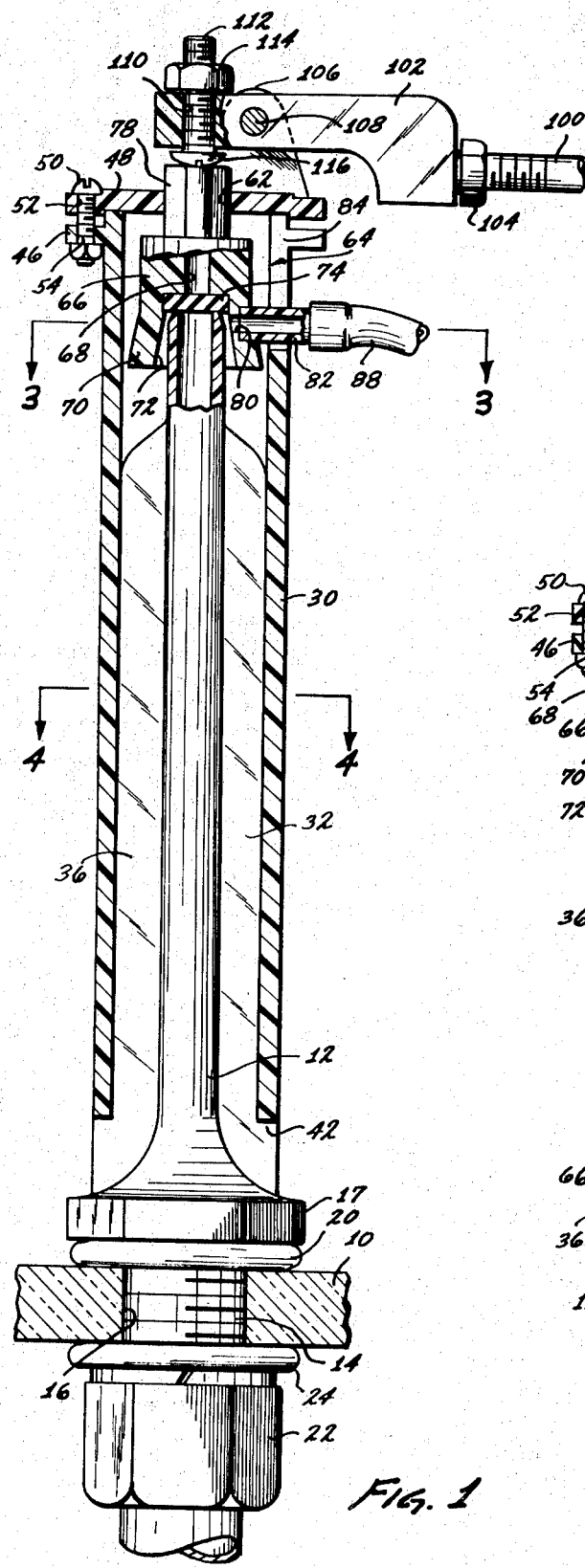

3,556,132

BALL COCK VALVE

SUMMARY OF THE INVENTION

The invention relates to improvements in a ball cock valve particularly adapted for use in connection with flash tanks. Basically, this type of ball cock valve is known. The improvements in this invention reside in particular means whereby there is an antisiphon feature embodied in the assembly, and means are provided to assure positive flow into the refill tube from the valve assembly.

In a preferred form of the invention as described in detail herein, it takes the form of a valve member operated by a float at the upper inside part of a cylinder or sleeve which surrounds the inflow pipe to the flush tank. The valve member is situated over the upper end of the inflow pipe. The valve member comprises a sealing disc which moves into and out of engagement with the end of the inflow pipe it has a downwardly extending skirt. In a sidewall of the skirt is a transverse bore having a tube connected to it which moves in an axial slot in the upper part of the cylinder or sleeve. This tube is connected to the tube, that is the refill tube that refills the flush tank. The upper part of the sleeve or cylinder is open to the atmosphere providing an antisiphon feature.

In the light of the foregoing, the primary object of the invention is to provide an improved ball cock valve of simplified but extremely effective construction embodying an antisiphon feature and positive means for assuring flow through the refill tube to the toilet bowl.

A further object resides in an improved ball cock valve wherein a valve member is provided having a downwardly extending skirt and a seating member that seats on the upper end of a refill tube.

A further object is to provide an improvement as in the foregoing object including a transverse tube connected to the skirt of the valve member, and a further connecting tube which provides a refill for the toilet bowl after flushing, the valve member being configurated such that pressure is generated within the skirt when water is flowing assuring positive flow into the refill tube.

Further objects and additional advantages of the invention will become apparent from the following detailed description and annexed drawings wherein:

FIG. 1 is a cross-sectional view of a preferred form of the invention;

FIG. 2 is a sectional view of the upper part of FIG. 1 showing the valve in another position;

FIG. 3 is a sectional view taken along the line 3–3 of FIG. 1; and

FIG. 4 is a sectional view taken along the line 4–4 of FIG. 1;

Referring more particularly to the various FIGS. of the drawings. the improved ball cock valve is shown in section in FIGS. 1 and 2. Numeral 10 designates a section of the flush tank in which the valve may be used. The inflow pipe is designated at 12 and it has a threaded part 14 which extends through a bore 16 in the bottom wall of the flush tank and is sealed thereto by way of the fitting 17 on the inflow pipe, having between it and the bottom of the tank a sealing gasket 20. Numeral 22 designates a coupling member having engagement with the threaded part 14 of the inflow pipe and between this coupling member and the bottom wall of the flush tank is a sealing gasket 24.

The inflow pipe 12 extends up into the flush tank as shown and around it is a cylinder or sleeve of larger diameter as designated at 30. The inflow pipe may be made of plastic and it is provided with radial web members as designated at 32, 34, 36 and 38 as may be seen in FIG. 4 which space and hold the cylinder 30 in position relative to the inflow tube, the webs 32 to 38 having square shoulders near their lower parts, one of which is designated at 42 against which the lower end of cylinder 30 abuts.

Near the upper end of the cylinder 30 is a flange 46. The upper end of the cylinder 30 is closed by a top cover or disc 48, and this cover is secured to the flange 46 by way of bolts, one of which is shown at 50 extending through registering openings in the peripheral part of the cover 48, and the flange 46 as designated at 52 and 54. The cover 48 has a central bore 62. The valve member is designated at 64. It may be made of plastic. It has a body 66 which is cylindrical having a central bore 68 and a downwardly extending skirt 70. The skirt flares or tapers outwardly as shown and the inside of the skirt is also tapered or flared as shown at 72. Within the skirt is a rubber sealing disc 74 which is adjacent the end of the small bore 68 in the valve member. The valve member has an integral upper part 78 which fits through the bore 62 and the cap 48, the sides of the upper part 78 having flats so that it is fluted to provide free access of atmospheric pressure through the bore 62 around the part 78.

In the side of the skirt 70 below the rubber disc 74 is a transverse bore 80 to which a tube 82 is connected, this tube being movable in a slot 84, that is an axial slot in the side of the cylinder 30. The tube 82 connects to a flexible tube 88, that is the refill tube that leads to the overflow tube conventionally found in flush tanks and by means of which the toilet bowl is refilled after being flushed. This structure, that is the refill tube arrangement, is itself well known in the art.

The ball cock valve is operated by a float not shown, which is at the end of a stem 100 and moves up and down with the level of liquid in the flush tank. It is connected to lever member 102 preferably made of plastic at the end of the stem 100 which extends into the plastic and being secured by a nut 104. The lever 102 extends between two upstanding legs forming a yoke, one of which is designated at 106 in FIG. 1, and then the member 102 is pivoted between the legs on a pivot member 108. At the end of the member 102 it has a bore 110 and extending through this bore is a bolt 112 having a nut 114 on it and having a head 116 which bears against the upper end of the member 78 for actuating the valve member.

FIG. 1 shows the valve in closed position and FIG. 2 shows it in open position. FIG. 3 is a cross-sectional view through the valve member.

From the foregoing those skilled in the art will readily understand the operation of the invention. When the toilet bowl is flushed the water drains out of the flush tank and the float drops moving the stem 100 and the member 102 into the shown in FIG. 2. This allows the valve member 64 to move up into the position as shown in FIG. 2 wherein the shoulder at the upper part of the cylindrical section 66 of the valve member comes into engagement with the top or cover 48. Incoming water through the inflow pipe 12 strikes against the rubber disc 74 and is thus able to open the valve in this manner. The valve member in moving up carries the tube 82 with it in the slot 84. The incoming water comes up out of the upper end of the inflow tube 12 and strikes the disc 74 and its direction is substantially reversed so that it now flows downwardly and against the inner sidewalls within the skirt 70. This produces a pressure within the skirt resulting from the velocity of flow such that water is forced into the tube 82 and into the refill tube 88 for refilling the toilet bowl after flushing. The water from the inflow pipe flows downwardly on the inside of the sleeve or cylinder 30 and exits at the bottom of this cylinder adjacent the top of the fitting or part 17.

At this time, the head of the screw 116 is in a position as shown in FIG. 2. As the flush tank fills up, the float and the lever operated thereby are moved back into the position of FIG. 1 closing the valve by seating the rubber disc 74 on the end of the inflow pipe 12, the upper end of which is beveled as shown. This cuts off the flow of water into the flush tank as well as through the refill tube 88 to the toilet bowl which has now been refilled. It will be observed that backflow or siphoning of the flush tank through the tube 12 cannot take place because of the air gap provided at the upper end of the sleeve or cylinder 30. That is the space around the valve member 64 is open to the atmospheric pressure within the flush tank through the bore 62 along the flats on the member 78 as well as through the slot 84.

From the foregoing, those skilled in the art will readily understand the nature of the invention, its construction and operation and the manner in which it achieves and realizes all of the objects and advantages as set forth in the foregoing as well as its many additional advantages that are apparent from the detailed description.

The foregoing disclosure is representative of a preferred form of the invention and is to be interpreted in an illustrative rather than a limiting sense, the invention to be accorded the full scope of the claims appended hereto.

We claim:

1. A ball cock valve comprising means forming an inlet pipe, a valve member movable to engage and seal the end of the inlet pipe, means forming a housing around the inlet pipe and valve member and constituting an outflow pipe, float means for actuating the valve member, said housing having opening means whereby the interior of the said housing around the valve member is at all times open to atmospheric pressure whereby an antisiphon feature is provided to prevent back siphoning of water through the inflow tube, said valve member having a downwardly extending skirt positioned around the upper end of the inflow pipe whereby incoming water strikes the skirt and is substantially reversed in direction by means of the said skirt, a port in the side of said skirt and tubular means connected thereto whereby water may be forced into said tubular means from inside of said skirt and caused to be directed to a toilet bowl to refill it.

2. A structure as in claim 1 wherein said valve member has a stem extending through said opening means and engageable with said float means.

3. A structure as in claim 1 wherein said housing has an opening therein positioned to allow movement of said tubular means therein.